(12) United States Patent
Brudnicki et al.

(10) Patent No.: US 9,898,728 B2
(45) Date of Patent: Feb. 20, 2018

(54) SYSTEM AND METHOD FOR ONE-TIME PAYMENT AUTHORIZATION IN A PORTABLE COMMUNICATION DEVICE

(75) Inventors: David Brudnicki, Duvall, WA (US); Michael Craft, Carlsbad, CA (US); Hans Reisgies, San Jose, CA (US); Andrew Weinstein, San Francisco, CA (US)

(73) Assignee: GFA Worldwide, Inc., Foster City, CA (US)

( * ) Notice: Subject to any disclaimer, the term of this patent is extended or adjusted under 35 U.S.C. 154(b) by 1017 days.

(21) Appl. No.: 13/448,193

(22) Filed: Apr. 16, 2012

(65) Prior Publication Data

US 2013/0159186 A1 Jun. 20, 2013

Related U.S. Application Data

(60) Provisional application No. 61/577,652, filed on Dec. 19, 2011.

(51) Int. Cl.
*G06Q 20/40* (2012.01)
*G06Q 20/32* (2012.01)
(Continued)

(52) U.S. Cl.
CPC ....... *G06Q 20/3224* (2013.01); *G06Q 20/227* (2013.01); *G06Q 20/3274* (2013.01);
(Continued)

(58) Field of Classification Search
CPC .............................. G06Q 20/20; G06Q 20/00
(Continued)

(56) References Cited

U.S. PATENT DOCUMENTS 7,292,999 B2  11/2007 Hobson et al.
7,376,583 B1   5/2008 Rolf
(Continued)

FOREIGN PATENT DOCUMENTS

WO      02/05165 A1   1/2002
WO    2010/126509    11/2010
WO    2011/153505    12/2011

OTHER PUBLICATIONS

International Search Report and Written Opinion of PCT/US12/70683 dated Mar. 8, 2013.
(Continued)

*Primary Examiner* — James D Nigh
*Assistant Examiner* — Margaret Neubig
(74) *Attorney, Agent, or Firm* — Dunlap Codding, P.C.

(57) ABSTRACT

A system for using a dynamic temporary credential with a portable communication device for use in a transaction with an electronic control point (e.g. point of sale, NFC access point) wherein the portable communication device has a geo-location module (e.g. GPS). The system has a centralized module that receives the portable communication device's current geo-location and transmits the dynamic temporary credential to the portable communication device and provides predictive transaction information—including the dynamic temporary credential and portable communication device's geo-location—to an authorization system operably associated with the electronic control point. The dynamic temporary credential has a predetermined time to live, which allows for the recycling of the dynamic credential, such recycling may take into account the geo-location for which the credential has been recently issued. A method for using a dynamic temporary credential with a portable communication device is also disclosed.

15 Claims, 11 Drawing Sheets

(51) Int. Cl.
*G06Q 20/22* (2012.01)
*G06Q 20/38* (2012.01)

(52) U.S. Cl.
CPC ....... *G06Q 20/3278* (2013.01); *G06Q 20/385* (2013.01); *G06Q 20/4012* (2013.01)

(58) Field of Classification Search
USPC .................................................. 705/50–79
See application file for complete search history.

(56) References Cited

U.S. PATENT DOCUMENTS

| | | | |
|---|---|---|---|
| 7,841,539 | B2 | 11/2010 | Hewton |
| 8,104,679 | B2 | 1/2012 | Brown |
| 8,229,852 | B2 | 7/2012 | Carlson |
| 8,424,061 | B2 | 4/2013 | Rosenoer |
| 8,639,602 | B2* | 1/2014 | Rao ...................... G06Q 20/108 705/35 |
| 8,682,802 | B1* | 3/2014 | Kannanari ......... G06Q 20/3274 705/64 |
| 8,751,316 | B1* | 6/2014 | Fletchall .............. G07G 1/0081 705/16 |
| 8,775,253 | B2* | 7/2014 | Comerford ............ G06Q 30/02 705/14.49 |
| 8,839,397 | B2 | 9/2014 | Schultz et al. |
| 9,336,519 | B2* | 5/2016 | Young .................. G06Q 20/045 |
| 2005/0097320 | A1 | 5/2005 | Golan et al. |
| 2008/0116264 | A1 | 5/2008 | Hammad et al. |
| 2008/0159318 | A1* | 7/2008 | Pierlot .................. G06F 21/335 370/412 |
| 2008/0275779 | A1 | 11/2008 | Lakshminarayanan |
| 2009/0327131 | A1 | 12/2009 | Beenau et al. |
| 2010/0015993 | A1 | 1/2010 | Dingler et al. |
| 2010/0024017 | A1 | 1/2010 | Ashfield et al. |
| 2011/0143711 | A1 | 6/2011 | Hirson |
| 2011/0153498 | A1 | 6/2011 | Makhotin et al. |
| 2011/0218868 | A1 | 9/2011 | Young et al. |
| 2011/0231238 | A1 | 9/2011 | Khan et al. |
| 2012/0005076 | A1* | 1/2012 | Dessert .................. G06Q 20/10 705/39 |
| 2012/0109969 | A1 | 5/2012 | Gil et al. |
| 2012/0122447 | A1 | 5/2012 | Craft et al. |
| 2012/0123868 | A1 | 5/2012 | Brudnicki et al. |
| 2012/0124394 | A1 | 5/2012 | Brudnicki et al. |
| 2012/0173431 | A1* | 7/2012 | Ritchie ................ G06Q 20/367 705/65 |
| 2012/0180124 | A1 | 7/2012 | Dallas et al. |
| 2012/0265685 | A1 | 10/2012 | Brudnicki et al. |
| 2012/0296741 | A1 | 11/2012 | Dykes |
| 2013/0054336 | A1* | 2/2013 | Graylin .................. H04L 67/02 705/14.26 |
| 2013/0159186 | A1 | 6/2013 | Brudnicki et al. |
| 2013/0173474 | A1* | 7/2013 | Ranganathan ..... G06Q 20/0655 705/67 |
| 2013/0226812 | A1 | 8/2013 | Landrok et al. |

OTHER PUBLICATIONS

Pashtan, Ariel. *Mobile Web Services*. Cambridge University Press, May 30, 2005. ISBN: 978-0-52-183049-2: pp. 60-61, 88-89.
Langer, Josef et al. *Anwendungen and Technik Von Near Field Communication (NFC)*. Springer: Berlin, Sep. 16, 2010. ISBN: 978-3-64-205497-6: pp. 220-223.
International Search Report and Written Opinion (PCT/US2014/060145); dated Apr. 16, 2015.
Wikipedia: "One-time password", Dec. 8, 2011, Retrieved from the Internet: URL:https://en.wikipedia.org/w/index.php?title=One-time_password&oldid=464805056 [retrieved on Jul. 2, 2015].
Wikipedia: "Mobile ticketing", Dec. 14, 2011, Retrieved from the Internet: URL:https://en.wikipedia.org/w/index.php?title=Mobile_ticketing&oldid=465842446 [retrieved on Jul. 2, 2015].
Wikipedia: "Location-based Service", Nov. 7, 2011, Retrieved from the Internet: URL:https://en.wi ki pedi a.org/w/i ndex.php?title=Location-based_service&oldid=459461447 [retrieved on Jul. 2, 2015].
Wikipedia: "Coupon", Dec. 5, 2011, Retrieved from the Internet: URL:https://en.wikipedia.org/w/index.php?title=Coupon&oldid=464139304 [retrieved on Jul. 2, 2015].
Extended European Search Report (EP 12859795.2); dated Jul. 13, 2015.
European Search Report regarding European Patent App. No. 14869040.7 dated May 9, 2017.
USPTO Office Action regarding U.S. Appl. No. 14/052,640 dated Jun. 5, 2017.
Bell ID, "Secure Element in the Cloud", 8 pages.
McLean, Heather, "Fujitsu puts NFC into cloud-based data transfer service", Jul. 22, 2011, 3 pages.
Dyer, Karl, "RBC to launch NFC payments in the cloud", Jul. 24, 2013, 3 pages.
Clark, Sarah, "SimplyTapp proposes secure elements in the cloud", Sep. 19, 2013, 7 pages.
Clark, Sarah, "Sixty banks and retailers sign up for new Korean mobile wallet service", Dec. 12, 2012, 3 pages.
Charrat, Bruno, Inside Secure, "Virtual SE for mPayment—Chip to Cloud," Sep. 18-20, 2012, 17 pages.
Chinese Office Action regarding Chinese Patent App. No. 201280069962.1 dated Sep. 20, 2017, 28 pages (including English translation).

* cited by examiner

SYSTEM AND METHOD FOR ONE-TIME PAYMENT AUTHORIZATION IN A PORTABLE COMMUNICATION DEVICE

This application claims priority to U.S. Provisional Patent Application No. 61/577,652, filed Dec. 19, 2011, which is incorporated by reference in its entirety.

TECHNICAL FIELD

The present invention relates generally to the use of secure data to complete a wireless transaction, and more particularly to a system and method for processing a one-time payment transaction upon request from a portable communication device, which may be based on physical world geo-location information.

BACKGROUND

Wireless transactions using RFID-based proximity cards are fairly common place. For instance, many workers use RFID keycards to gain access to their workplace and drivers use RFID passes to pay tolls at highway speeds. RFID, which stands for radio-frequency identification, uses electromagnetic waves to exchange data between a terminal and some object for the purpose of identification. More recently, companies have been trying to use RFIDs supported by cellular telephones to implement an electronic payment product (i.e. credit and/or debit card). However, basic RFID technology raises a number of security concerns that have prompted modifications of the basic technology. Still, widespread adoption of RFID as a mechanism for electronic payments has been slow.

Smartphone penetration with consumers is also growing quickly. A challenge has arisen on how to enable consumers to make electronic payment using their existing mobile phone. Near Field Communication technology in phones with embedded secure elements enables one potential solution for this challenge.

Near Field Communication (NFC) is another technology that like RFID uses electromagnetic waves to exchange data. NFC is an open standard (see, e.g. ISO/IEC 18092) specifying modulation schemes, coding, transfer speeds and RF interface. Unlike RFID, NFC waves are only transmitted over a short-range (on the order of a few inches) and at high-frequencies. Thus, there has been wider adoption of NFC as a communication platform because it provides better security for financial transactions and access control. Other short distance communication protocols are known and may gain acceptance for use in supporting financial transactions and access control.

NFC devices are already being used to make payments at some point of sale devices. But there are many point of sale devices that are not enabled for NFC communications. Accordingly, the present invention seeks to provide a solution to enable any smartphone to make highly secure electronic payments at merchants that accept legacy electronic payments with existing point-of-sale equipment.

Another problem is the myriad of communications protocols associated with the various different point of sale terminals available. So, for instance, the protocol necessary to successfully communicate wirelessly with an IBM point of sale terminal may be very different from the protocol necessary to communication with an NCR terminal. Accordingly, it is an object of the present invention to provide a system and method for using geo-location data (where available) to try to predetermine the likely point of sale terminal device present in the retail establishment co-located with the portable communication device.

The ability for physical merchants to accept electronic forms payment has grown substantially in developed countries and is rapidly growing in developing countries. The financial industry has developed and deployed stringent systems, methods, and requirements on electronic transactions to mitigate and minimize fraudulent behavior.

Accordingly, the present invention also seeks to provide one or more solutions to the foregoing opportunities and related problems as would be understood by those of ordinary skill in the art having the present specification before them. These and other objects and advantages of the present disclosure will also be apparent to those of ordinary skill in the art having the present drawings, specifications, and claims before them. It is intended that all such additional systems, methods, features, and advantages be included within this description, be within the scope of the disclosure, and be protected by the accompanying claims.

BRIEF DESCRIPTION OF THE DRAWINGS

For a better understanding of the present disclosure, non-limiting and non-exhaustive embodiments are described in reference to the following drawings. In the drawings, like reference numerals refer to like parts through all the various figures unless otherwise specified.

DETAILED DESCRIPTION

Figure 1A:
FIG. 1A illustrates an end user attempting to use her portable communication device to conduct a secure payment transaction at a point of sale.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention and its components may take the form of an entirely hardware embodiment, an entirely software embodiment or an embodiment combining software and hardware aspects. The following detailed description is, therefore, not to be taken in a limiting sense.

Portable Communication Devices

The present invention provides a system and method that can be utilized with a variety of different portable communication devices, including but not limited to PDA's, cellular phones, smart phones, laptops, tablet computers, and other mobile devices that preferably include cellular voice and data service as well as preferably access to consumer downloadable applications. One such portable communication device could be an iPhone, Motorola RAZR or DROID; however, the present invention is preferably platform and device independent. For example, the portable communication device technology platform may be Microsoft Windows Mobile, Microsoft Windows Phone 7, Palm OS, RIM Blackberry OS, Apple OS, Android OS, Symbian, Java or any other technology platform. For purposes of this disclosure, the present invention has been generally described in accordance with features and interfaces that are optimized for a smart phone utilizing a generalized platform, although one skilled in the art would understand that all such features and interfaces may also be used and adapted for any other platform and/or device.

The portable communication device includes one or more short proximity electromagnetic communication devices, such as an NFC, RFID, or Bluetooth transceiver. It is presently preferred to use an NFC baseband that is Compliant with NFC IP 1 standards (www.nfcforum.org), which provides standard functions like peer-to-peer data exchange, reader-writer mode (i.e. harvesting of information from RFID tags), and contactless card emulation (per the NFC IP 1 and ISO 14443 standards) when paired with a secure element on the portable communication device and presented in front of a "contactless payment reader" (see below at point of sale). As would be understood in the art by those having the present specification, figures, and claims before them, the NFC IP 1 standards are simply the presently preferred example, which could be exported—in whole or in part—for use in association with any other proximity communication standard. It is further preferred that the portable communication device include an NFC/RFID antenna (conformed to NFC IP 1 and ISO 14443 standards) to enable near field communications. However, as would be understood in the art NFC/RFID communications may be accomplished albeit over even shorter ranges and potential read problems.

The portable communication device also includes a mobile network interface to establish and manage wireless communications with a mobile network operator. The mobile network interface uses one or more communication protocols and technologies including, but not limited to, global system for mobile communication (GSM), 3G, 4G, code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols to communicate with the mobile network of a mobile network operator. Accordingly, the mobile network interface may include as a transceiver, transceiving device, or network interface card (NIC). It is contemplated that the mobile network interface and short proximity electromagnetic communication device could share a transceiver or transceiving device, as would be understood in the art by those having the present specification, figures, and claims before them.

The portable communication device further includes a location transceiver that can determine the physical coordinates of device on the surface of the Earth typically as a function of its latitude, longitude and altitude. This location transceiver preferably uses GPS technology, so it may be referred to herein as a GPS transceiver; however, it should be understood that the location transceiver can additionally (or alternatively) employ other geo-positioning mechanisms, including, but not limited to, triangulation, assisted GPS (AGPS), E-OTD, CI, SAI, ETA, BSS or the like, to determine the physical location of the portable communication device on the surface of the Earth.

The portable communication device further includes a user interface that provides some means for the consumer to receive information as well as to input information or otherwise respond to the received information. As is presently understood (without intending to limit the present disclosure thereto) this user interface may include a microphone, an audio speaker, a haptic interface, a graphical display, and a keypad, keyboard, pointing device and/or touch screen. The portable communication device will also include a microprocessor and mass memory. The mass memory may include ROM, RAM as well as one or more removable memory cards. The mass memory provides storage for computer readable instructions and other data, including a basic input/output system ("BIOS") and an operating system for controlling the operation of the portable communication device.

The portable communication device will also include a device identification memory dedicated to identify the device, such as a SIM card. As is generally understood, SIM cards contain the unique serial number of the device (ESN), an internationally unique number of the mobile user (IMSI), security authentication and ciphering information, temporary information related to the local network, a list of the services the user has access to and two passwords (PIN for usual use and PUK for unlocking). As would be understood in the art by those having the present specification, figures, and claims before them, other information may be maintained in the device identification memory depending upon the type of device, its primary network type, home mobile network operator, etc.

Portable communication devices may have two subsystems: (1) a "wireless subsystem" that enables communication and other data applications as has become commonplace with users of cellular telephones today, and (2) the "secure transactional subsystem" which may also be known as the "payment subsystem". The secure transactional subsystem would include a secure element and associated device software for communication to management and provisioning systems as well as the customer facing interface for use and management of secure data stored in the secure element. It is contemplated that this secure transactional subsystem will preferably include a Secure Element, similar (if not identical) to that described as part of the Global Platform 2.1.X, 2.2, or 2.2.X (www.globalplatform.org). The secure element has been implemented as a specialized, separate physical memory used for industry common practice of storing payment card track data used with industry common point of sale; additionally, other secure credentials that can be stored in the secure element include employment badge credentials (enterprise access controls), hotel and other card-based access systems and transit credentials.

Mobile Network Operator

Each of the portable communications devices is connected to at least one mobile network operator. The mobile network operator generally provides physical infrastructure that supports the wireless communication services, data applications and the secure transactional subsystem via a plurality of cell towers that communicate with a plurality of portable communication devices within each cell tower's associated cell. In turn, the cell towers may be in operable communication with the logical network of the mobile network operator, POTS, and the Internet to convey the communications and data within the mobile network operator's own logical network as well as to external networks including those of other mobile network operators. The mobile network operators generally provide support for one or more communication protocols and technologies including, but not limited to, global system for mobile communication (GSM), 3G, 4G, code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols to communicate with the portable communication devices.

Retail Subsystem

Standard at merchants today is an Internet Protocol connected payment system that allows for transaction processing of debit, credit, prepay and gift products of banks and merchant service providers. By swiping a magnetic stripe enabled card at the magnetic reader of a Point of Sale (or Point of Purchase) Terminal, the card data is transferred to the point of sale equipment and used to confirm funds by the issuing bank. This point of sale equipment has begun to include contactless card readers as accessories that allow for the payment card data to be presented over an RF interface, in lieu of the magnetic reader. The data is transferred to the reader through the RF interface by the ISO 14443 standard and proprietary payment applications like PayPass and Paywave, which transmit the contactless card data from a card and in the future a mobile device that includes a Payment Subsystem.

A retailer's point of sale device 75 may be connected to a merchant payment network via a wireless or wired connection. This point of sale network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the point of sale network may utilize any communication method that allows information to travel between the point of sale devices and financial services providers for the purpose of validating, authorizing and ultimately capturing financial transactions at the point of sale for payment via the same financial services providers.

System Management Back End

Figure 1B:
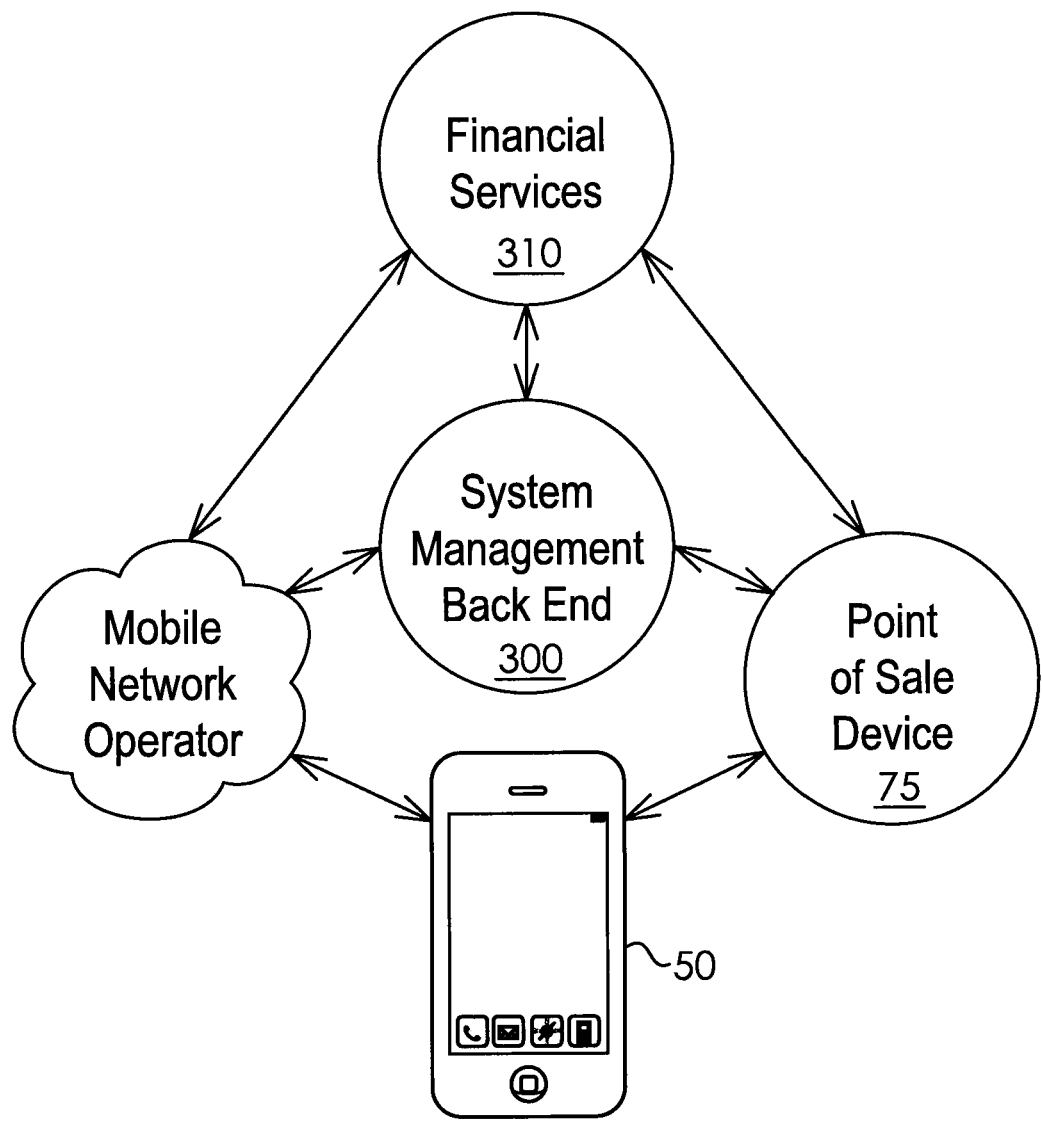
FIG. 1B illustrates the operable interconnections between the end user's smartphone (i.e. portable communication device) and various subsystems, including the system management back end.

The system includes a system management back end. As shown in FIG. 1B, the system management back end 300 is connected to the retail subsystem (see point of sale device 75), the secure transactional subsystem (made up of one or more financial service providers) 310, and to a plurality of portable communication devices 50 via the infrastructure of at least one mobile network operator. The system management back end 300 comprises a server operably communicating with one or more client devices. The server is also in operable communication with the retailer subsystem 75, secure transactional subsystem 310, and one or more portable communication devices 50. Any type of voice channel may be used in association with the present invention, including but not limited to VoIP.

The server of the system management back end 300 may comprise one or more general-purpose computers that implement the procedures and functions needed to run the system back office in serial or in parallel on the same computer or across a local or wide area network distributed on a plurality of computers and may even be located "in the cloud" (preferably subject to the provision of sufficient security). The computer(s) comprising the server may be controlled by Linux, Windows®, Windows CE, Unix, or a Java® based operating system, to name a few. The system management back end server is operably associated with mass memory that stores program code and data. Data may include one or more databases, text, spreadsheet, folder, file, or the like, that may be configured to maintain and store a knowledge base, user identifiers (ESN, IMSI, PIN, telephone number, email/IM address, billing information, or the like).

The system management back end server may support a case management system to provide call traffic connectivity and distribution across the client computers in the customer care center. In a preferred approach using VoIP voice channel connectivity, the case management system is a contact/case management system distributed by Contactual, Inc. of Redwood City, Calif. The Contactual system is a standard CRM system for a VoIP-based customer care call center that also provides flexibility to handle care issues with simultaneous payments and cellular-related care concerns. As would be understood by one of ordinary skill in the art having the present specification, drawings and claims before them other case management systems may be utilized within the present invention such as Salesforce (Salesforce.com, inc. of San Francisco, Calif.) and Novo (Novo Solutions, Inc. of Virginia Beach, Va.).

The system management back end server also supports issuing engine 2010, user unique identification database 2011, merchant-geolocation collation database 2012, and predictive transaction module 2015. These elements will be described later in the specification.

Each client computer associated with the system management back end server has a network interface device, graphical user interface, and voice communication capabilities that match the voice channel(s) supported by the client care center server, such as VoIP. Each client computer can request status of both the cellular and secure transactional subsystems of a portable communication device. This status may include the contents of the soft memory and core performance of portable communication device, the NFC components: baseband, NFC antenna, secure element status and identification.

Payment Subsystem

Figure 2:
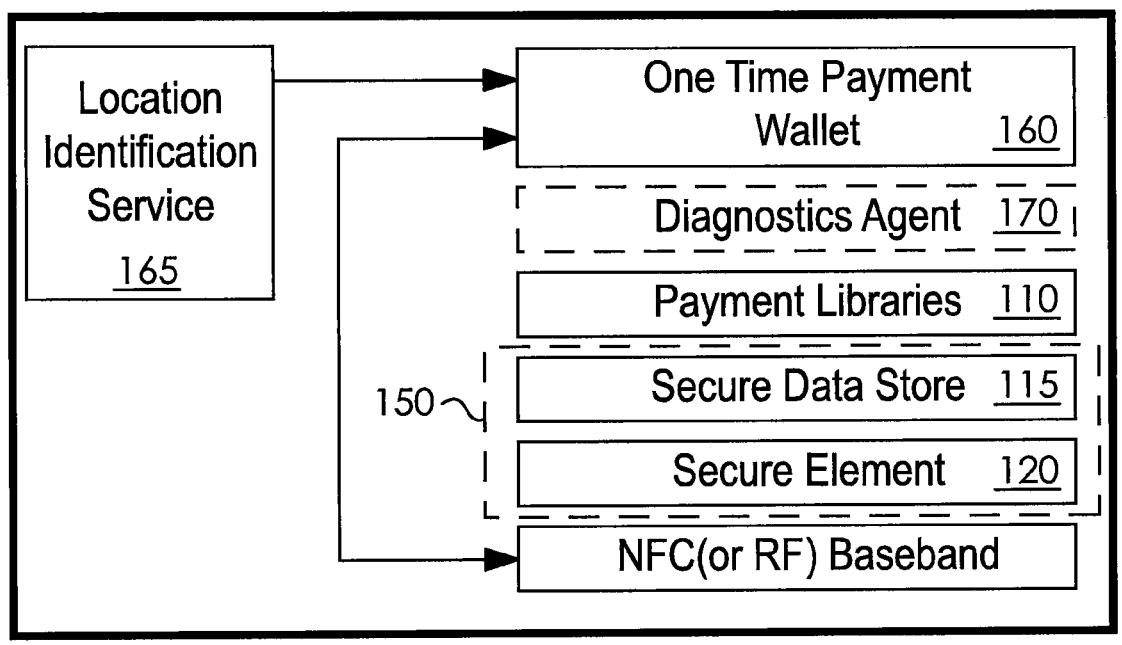
FIG. 2 is a block diagram illustrating some of the logical blocks within a portable communication device that may be relevant to the present system.

As shown in FIG. 2, each portable communication device 50 may contain one-time payment wallet 160, payment libraries 110, secure element 120, an NFC (or RF) Baseband, a payment subsystem 150 (i.e. secure data store 115 and secure element 120), and diagnostic agent 170. One-time payment wallet 160 is a computer application that enables any portable communication device to request and emulate credentials (e.g., card, coupon, access control and ticket data) in association with NFC/RF Baseband that are downloaded to the device 50 (preferably into payment subsystem 150) for temporary use. The application may also be implemented on legacy feature phones (non-smartphones) using WAP, J2ME RTE, and/or SMS channel in lieu of smartphone application. As will be discussed more fully herein below, the credentials are most preferably NFC based, but they may be RFID-, 2-D bar code- or Arabic numeral-based.

The payment libraries 110 are used by one-time payment wallet 160 to manage (and perform housekeeping tasks on) the secure element 120, interface with the system management back end 300, and perform over-the-air (OTA) provisioning via data communication transceiver (including its SMS channel), on the device 50. It is contemplated that the OTA data communications will be encrypted in some manner and an encryption key will be deployed in a card service module that is operably associated with the portable communication device 50 and with the payment subsystem 150. In one embodiment, card services module is operably coupled to one-time payment wallet 160 (deployed as a third party application as described below) and to the payment subsystem 150. Card services module generally enforces access control to the data stored in the payment subsystem 150 and controls the function(s) each application is allowed to conduct with the payment subsystem 150. In one embodiment, card services module verifies the author/issuer of each third party application in use on the portable communications device (as generally described below). The payment subsystem 150 may be used to store credentials such as the temporary one-time payment card in addition to other payment card(s), coupon, access control and ticket data (e.g., transportation ticket data, concert ticket data, etc.). Some of these credential types may be added to the payment subsystem and payment libraries depending upon circumstances.

The secure data store 115 provides secured storage on the portable communication device 50. Various levels of security may be provided depending upon the nature of the data intended for storage in secure data store 115. For instance, secure data store 115 may simply be password-protected at the operating system level of device 50. As is known in these operating systems, the password may be a simple alphanumeric or hexadecimal code that is stored somewhere on the device 50. Alternatively, the data in secure data store 115 is preferably encrypted. More likely, however, the secure data store 115 will be set up as a virtual secure element in the manner disclosed in the co-pending patent application (owned by the assignee of the present application) entitled "System and Method for Providing A Virtual Secure Element on a Portable Communication Device," U.S. patent application Ser. No. 13/279,147, filed on Oct. 21, 2011 and hereby incorporated by reference.

One-Time Payment Via a Smartphone

Because some point-of-sale equipment does not accept NFC payments and some users don't have established NFC accounts, the present invention enables any portable communication device to make highly secure electronic payments at merchants that accept legacy electronic payments via their existing point-of-sale equipment.

In order to use the system for a one-time payment to a retailer, the consumer will have downloaded a one-time payment wallet application and have at least one existing account with a specified bank. The consumer should also have registered the at least one account with one-time payment issuer 310 (which may also be the specified bank). In addition, the consumer should also have a mobile data service for their smart phone (or portable communication device 50).

One-time payment wallet 160 may remove some of the complexity involved in the storage, maintenance and use of credentials because of the temporary nature of the credentials and its combination with geo-location confirmation. Among the potential actions that may be controlled by One-Time Payment Wallet 160 are those associated with:

a. wallet management (e.g., set, reset or enable wallet passcodes; get URL of OTA server; over-the-air registry provisioning; set payment timing; increase payment timing; set default card; list issuers, memory audit; determine SE for storage of credential; update wallet status);

b. credential management (e.g., add credential; view credential detail; delete credential; activate credential (for redemption/payment); deactivate credential; lock/unlock credential; require passcode access; get credential image; set access passcode); and c. Secure Element (SE) Management (e.g., get credential; update credential; update meta data; delete credential; wallet lock/unlock; SE lock/unlock).

Figure 3A:
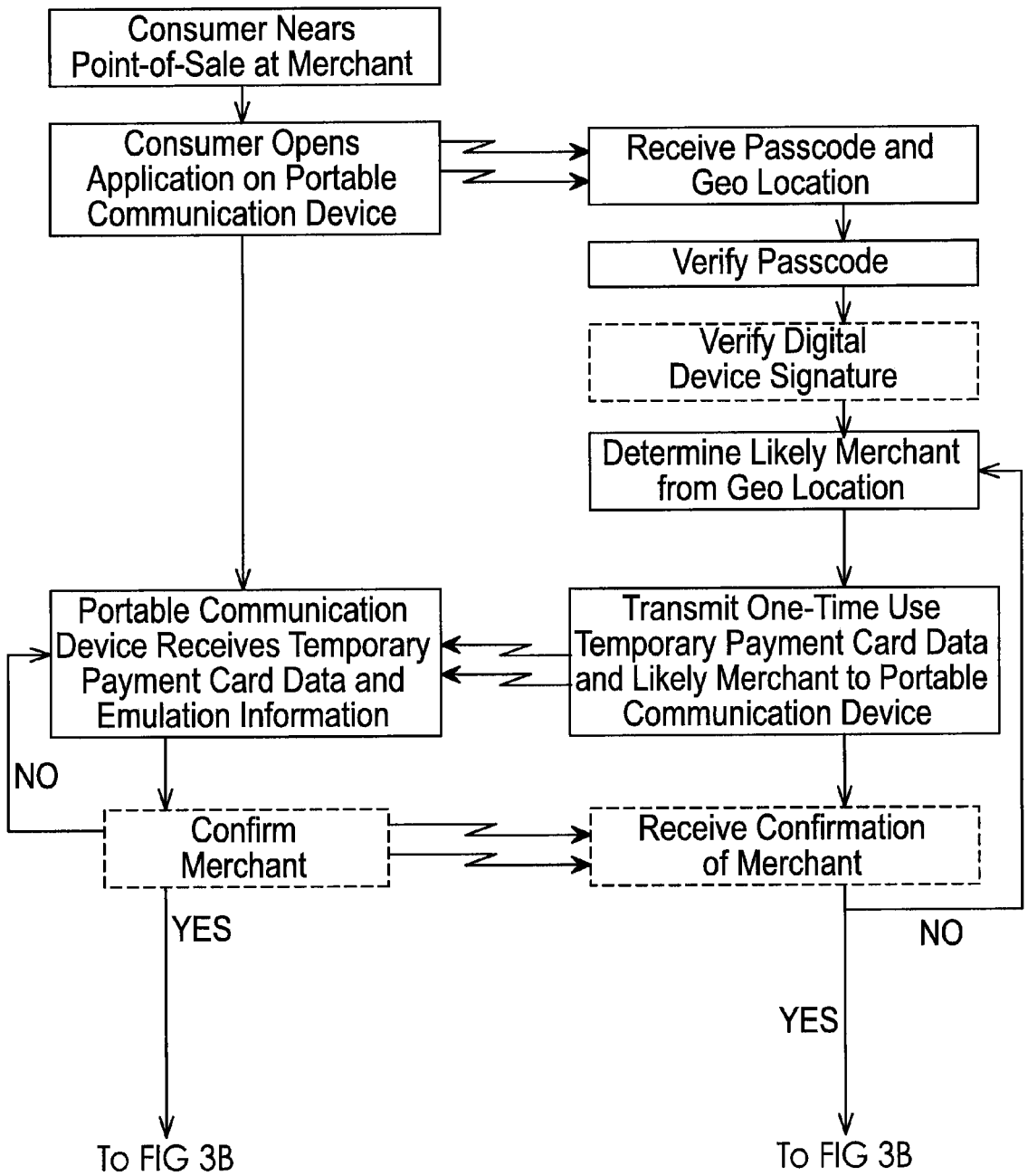
FIGS. 3A and 3B together illustrate the flow in one potential embodiment of a process for one-time payment.
Figure 3B:
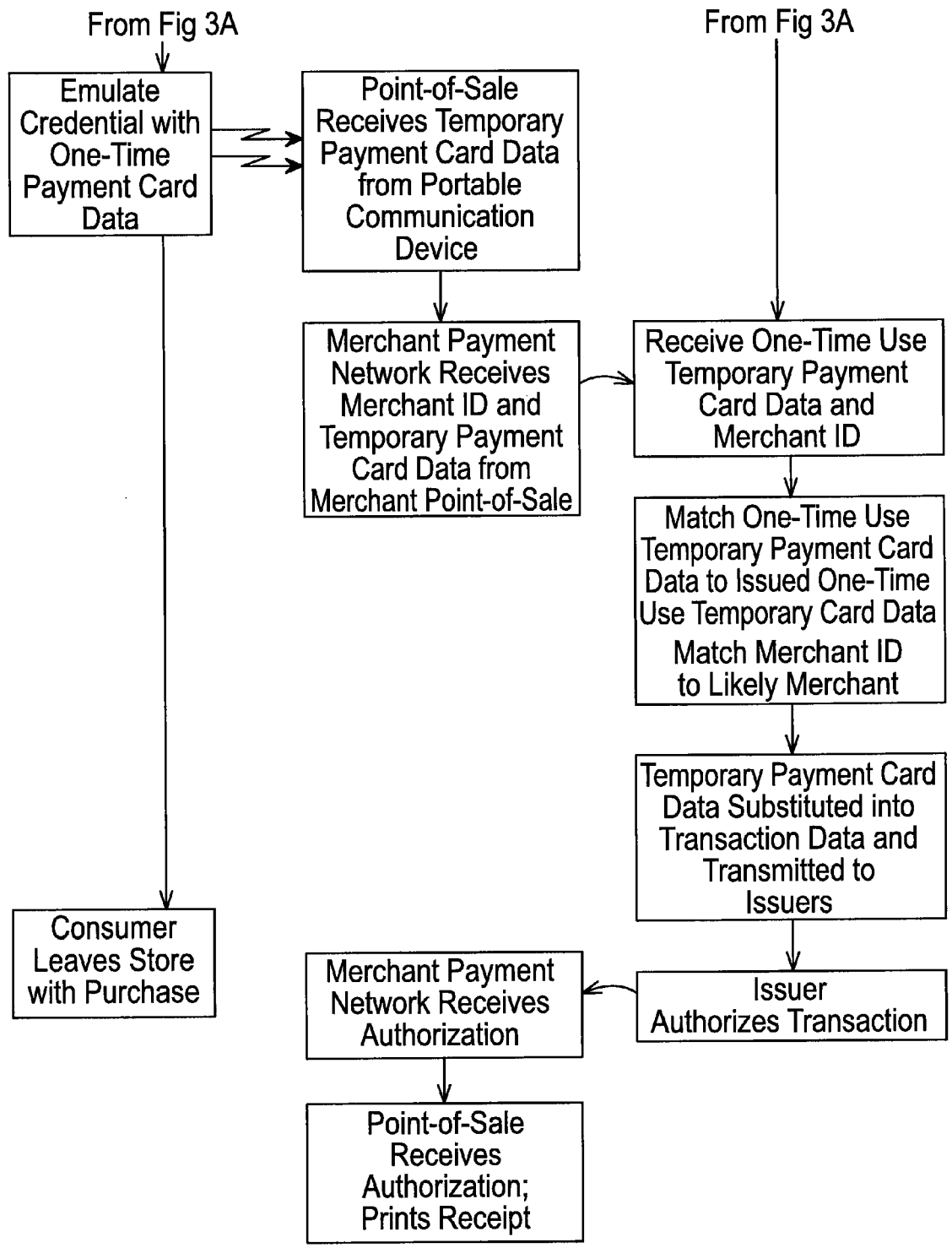

FIGS. 3A-3B together illustrate one potential embodiment (with various potential alternatives) for a process for obtaining and using a one-time payment credential using the one-time payment wallet 160. The consumer may enter a physical retail store with their smartphone (i.e. portable communication device 50) and go about their shopping experience as normal. With the one-time payment wallet 160 downloaded on their smartphone 50, when the consumer is ready to check out of the physical retail store, the consumer may use their smart phone to pay even with a legacy system by opening a solution-enabled smartphone application.

Figure 4:
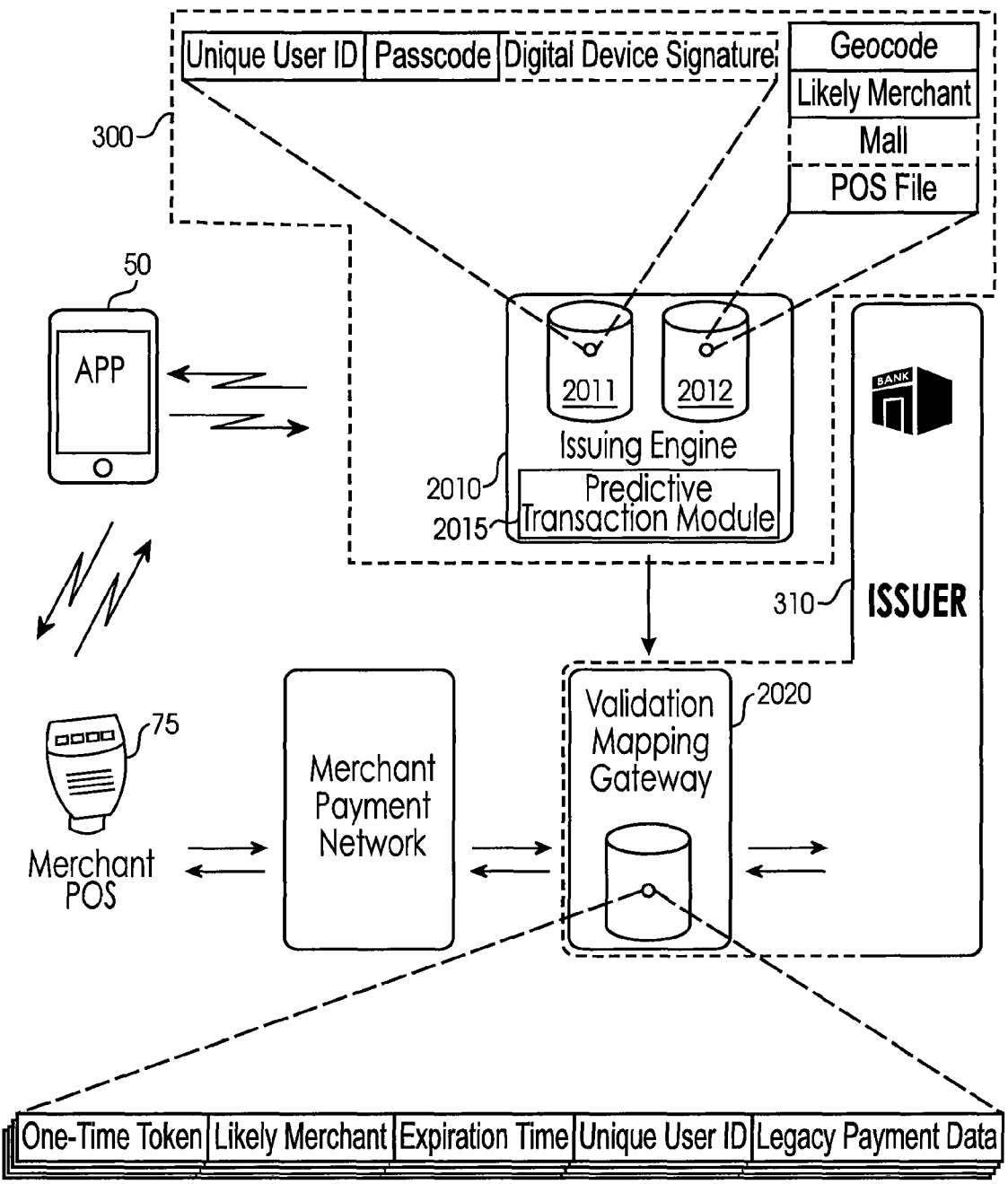
FIG. 4 is a block diagram illustrating the information flow between a portable communication device and the remainder of the payment ecosystem in relation to the one-time payment process of FIGS. 3A and 3B.
Figure 5:
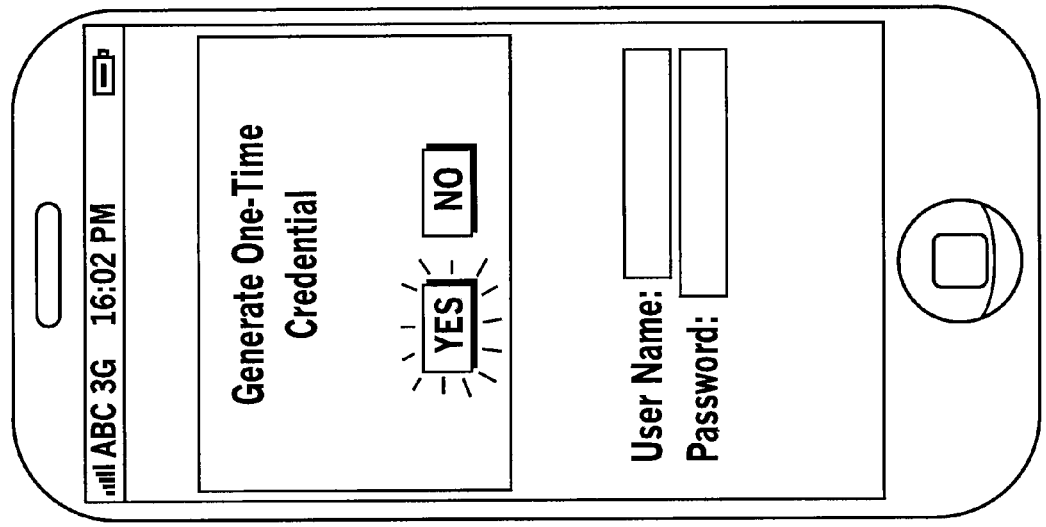

The consumer approaches the point-of-sale 75, opens the one-time payment wallet 160 on smartphone 50, enters the consumer's password/passcode via the user interface on the one-time payment screen (see FIG. 5). The one-time payment wallet 160 sends the consumer's passcode and geo-location coordinates (as generated by the location identification service 165, FIG. 2) to the issuing engine 2010 (FIG. 4). In one embodiment, one-time payment wallet 160 may also provide an ability for the consumer to communicate the estimated amount of the upcoming payment to the issuing engine 2010 prior to generation of the temporary payment card information. By incorporating information regarding the estimated amount of the one-time payment into the confirmation process, additional security for the one-time code may be provided.

The issuing engine 2010 verifies the passcode (e.g., using the user unique identification database 2011). Receipt of the correct passcode indicates to the system that the consumer will be making a payment within a short predetermined period of time (on the order of a few minutes, which could be extended in certain circumstances). The issuing engine 2010 uses the geo location coordinates received from the portable communication device 50 to determine the likely merchant and looks up the merchant's point-of-sale details in a database operably associated with the issuing engine 2010 (e.g., the merchant-geolocation collection database 2012). In particular, based on the geo-location information received, the issuing engine 2010 performs a database query to determine which contactless point of sale terminal is installed (or likely to be installed) at the consumer's location. In a preferred embodiment, the portable communication device 50 may also display a list of the next most likely retail stores (e.g. the next top five) where the portable communication device 50 may be located (see, e.g. FIG. 6A). Based on the identified location and/or point of sale terminal, the card services module of the portable communication device 50 configures the payment system 150 with the data formats and other contact-less point of sale data specific to this location and/or point of sale such that the device 50 is supported or optimal presentation of card, coupon, ticket or access control emulation. The system may also identify to the consumer new card products available for that geo-location that the consumer does not already have loaded in payment libraries 110. In some embodiment, the system may load needed libraries. The issuing engine 2010 includes a database (e.g., the merchant-geolocation collection database 2012) of all electronic-payment accepting merchants, which may include the merchant location, merchant identification number used in legacy electronic payments, the legacy payment schemes accepted by each merchant location, and the capabilities of each merchant location's point of sale equipment capabilities. (See Table 1 below). Although merchant-geolocation collection database 2012 is described as being included within or otherwise part of the issuing engine 2010, it is conceived that the merchant-geolocation collection database 2012 may be included within, part of or associated with the portable communication device 50, the issuer 310 or separately hosted.

cation number (IIN) to operate in an international, inter-industry, and/or intra-industry interchange), ISO/IEC 7813 (relating to the data structure and content of magnetic tracks used to initial financial transactions), and ISO 8583 formatting (which is a business messaging protocol, based on a proprietary standard).

Figure 7A:
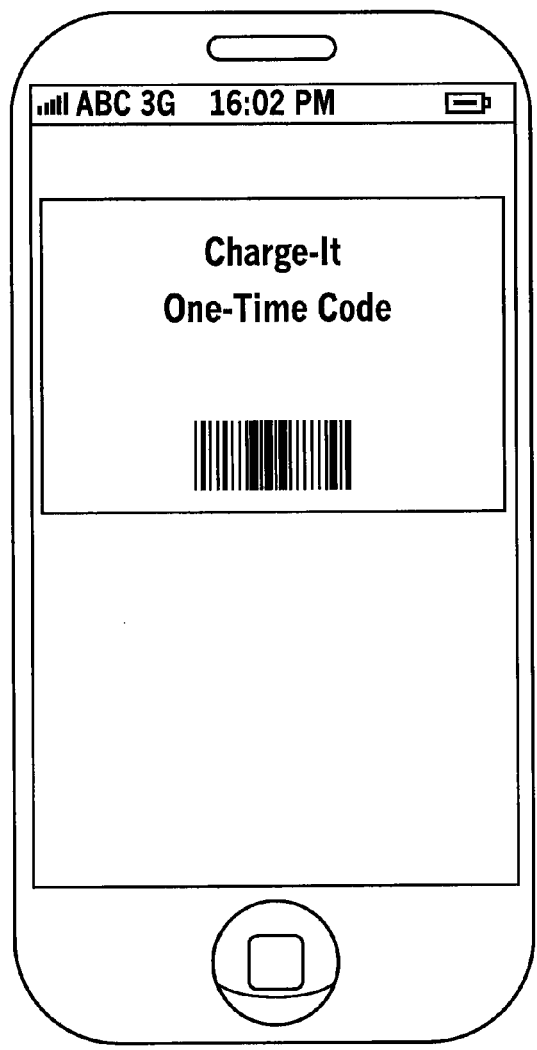
FIGS. 7A, and 7B are illustrations of two potential embodiments of one-time payment credentials generated by an exemplary wallet user interface on a representative portable communication device.
Figure 7B:
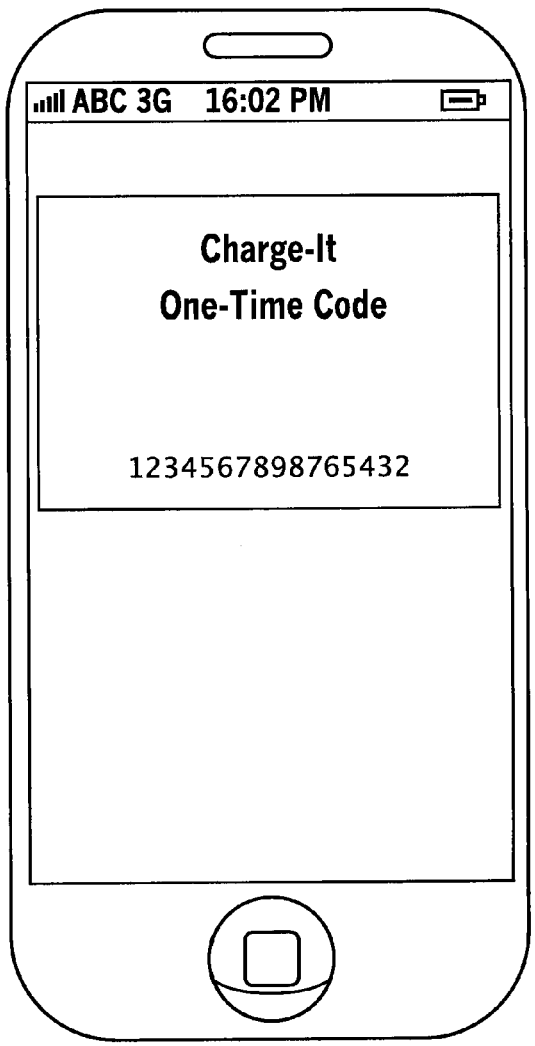

In one preferred embodiment, the one-time payment wallet 160 formats the temporary payment card based on the capabilities of the portable communication device 50 as well as the capabilities of the merchant's point-of-sale equipment 75. The temporary payment card information may also be formatted in multiple formats to provide the consumer with options that may be presented to the merchant cashier. FIGS. 7A and 7B illustrate two of the possible types of one-time payment codes that can be transmitted to the portable communication device 50. FIG. 7A depicts the one-time payment code as a 2-D bar code. As would be understood by those of ordinary skill in the art this bar code could be 3-D or a QR code. FIG. 7B depicts the one-time payment code as a numeric code, which may be 16 digits or a different length as desired.

One format that the temporary payment card information may be rendered on the smartphone display is an ISO/IEC 7813 compliant number (i.e., PAN) that the clerk at the merchant enters by hand into the merchant point-of-sale. Another format that the temporary payment card data may be rendered on the smartphone display in barcode (ISO/IEC 15426-1), 2-D barcode (ISO/IEC 15426-2), QR code (ISO/IEC 18004:2006), or other such similar methods that transmit ASCII data, then captured by the optical scanner of the merchant's point of sale. Yet another format that the temporary payment card data may be rendered using NFC Peer-to-Peer mode (ISO/IEC 18092), NFC Tag Emulation (NDEF, ISO14443 and Felica), or NFC Card Emulation mode (ISO 14443 card emulation) or RFID modes.

The temporary payment card data expires after a short predetermined period of time, such as two (2) minutes to provide further security. This time could be extended as long as the issuer is willing. It is believed that less than 30 minutes, or even less than 20 minutes or even 10 minutes

TABLE 1

Examples of Merchants and One-Time Payment Information

| Merchant Name | Merchant Location GPS (Lat./Long.) | Merchant Location Address | Legacy Merchant ID Number | Legacy Payment | Equipment Capability |
|---|---|---|---|---|---|
| Grocery Land | 37.48 N, 122.24 W | 100 Marine Parkway Suite 400 Redwood City, CA 94065 | XQ24MZ122A | Bar Code | Laser Scanner |
| Appliance Land | 37.48 N, 122.24 W | 110 Marine Parkway Redwood City, CA 94065 | YF234XY302 | 3-D Bar Code | 3-D Bar Code Reader |
| Must Buy | 37.48 N, 122.24 W | 120 Marine Parkway Redwood City, CA 94065 | MN343D | NFC | NFC Reader |

The issuing engine 2010 then generates the one-time use temporary payment card and transmits the temporary payment card data and identity of the likely merchant to the portable communication device 50 over-the-air. This temporary payment card information may be formatted in real time using existing standards and practices of the legacy electronic payment industry, including personal account number, issuer identification number, ISO/IEC 7812 (relating to the identification of issuers using an issuer identifiwould be preferred. Other expiration times can be used and/or programmed as desired.

Figure 6A:
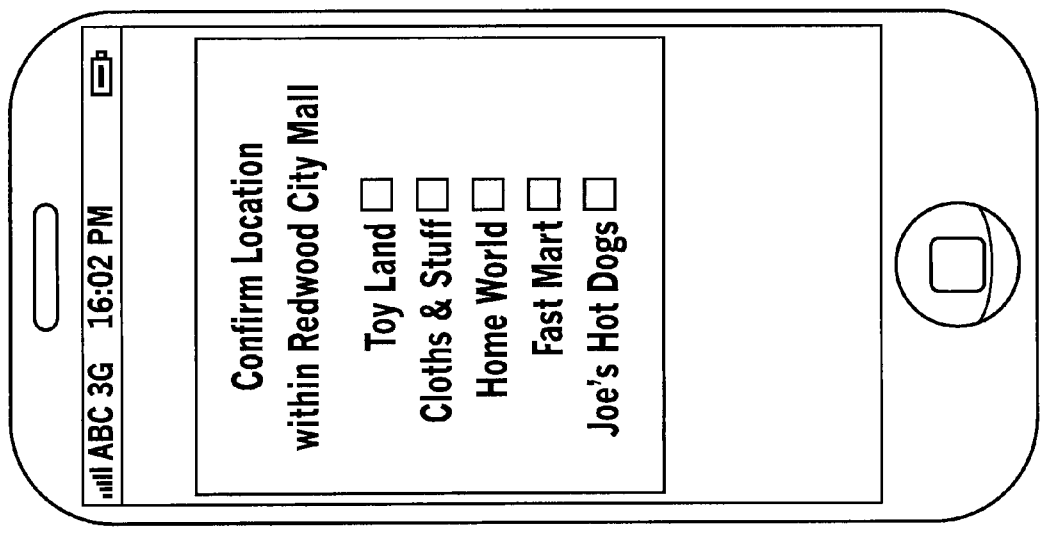
FIGS. 5, 6, and 6A are illustrations of an exemplary wallet user interface that may be deployed on a smart phone
Figure 6:
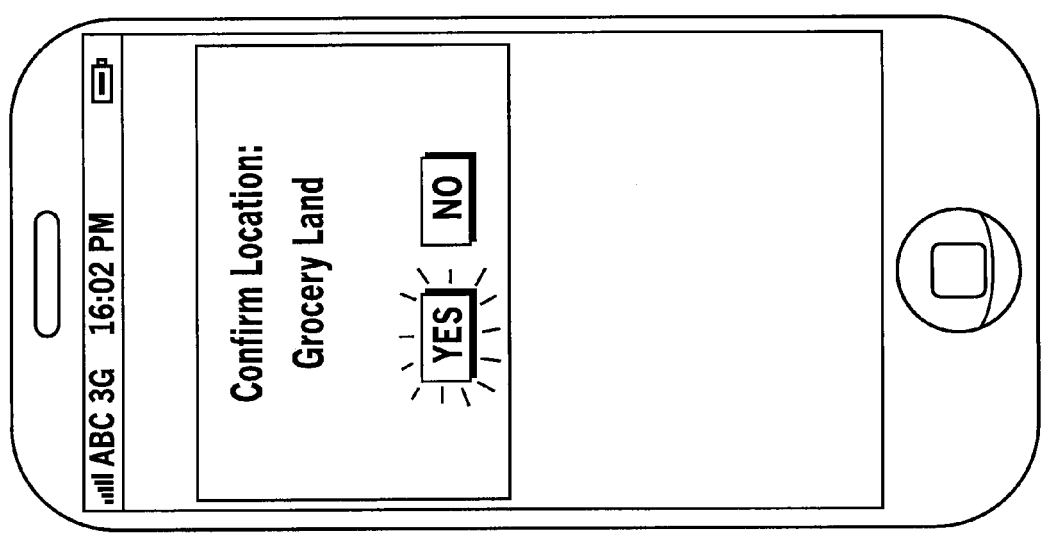

The portable communication device 50 receives the temporary credential data, likely merchant, and emulation information from the issuing engine 2010. In a preferred embodiment, the portable communication device 50 confirms the likely merchant was correctly selected from database 2012. In one approach illustrated in association with FIG. 6, the portable communication device asks the user to the confirm the location. In the illustrated example, the user interface asks whether the location is "Grocery Land"? As the consumer is shown in FIG. 1A standing in Grocery Land, the consumer should select the "yes" button on FIG. 6. If the system has selected the wrong retailer, the system may provide alternatives for ascertaining the correct retailer. For example, FIG. 6A depicts the provision of a list of potential merchants close to the consumers' proximity in an example where the one-time credential was requested from within what the issuing engine 2010 recognized as a mall (or other high-density grouping of merchants). As would be understood by those skilled in the art having the present specification, drawings, and claims before them, the list of nearby merchants need not be limited to those merchants within a single mall. Alternatives may be selected from other retailers that were geographically close to the geo-location received by the server. As would be further understood, the alternatives may be presented to the end user in the form of a pull-down menu or list.

In an embodiment where the consumer uses portable device 50 to confirm the merchant, the confirmation of the likely merchant may be received by issuing engine 2010. If the likely merchant was identified incorrectly, then the issuing engine may issue new emulation information to the portable communication device 50. Once the likely merchant is known, the predictive transaction module 2015 of issuing engine 2010 transmits the ID for that likely merchant, the unique user ID associated with portable communication device 50, the one-time use token generated for the transaction, and the expiration time to the validation mapping gateway 2020.

The validation mapping gateway 2020 may be physically hosted by a bank, by an issuer 310, or by a payment processor network and may be deployed as either a service or as a sub-system installed and integrated at existing transaction processors, card schemes, financial institutions, and other entities. Upon receiving the data from the predictive transaction module 2015, the received data is stored in a database associated with the validation mapping gateway. Where such data is provided, the temporary data may be associated with the legacy card data previously associated with the unique user ID. To the extent such legacy card-unique user ID associations exist it may be created by the issuers 310 or even by the consumer in an electronic transaction directly between the portable communication device 50 and the validation mapping gateway 2020 orchestrated by the system management back end 300.

In a preferred embodiment, the predictive transaction module 2015 send the data to the validation mapping gateway 2020 at substantially the same time one-time use credential information is being transmitted to the portable communication device 50. In this approach, the validation mapping gateway 2020 can anticipate the consumer transaction from the merchant POS 75 via the merchant payment network. In particular, in such an embodiment, the Validation mapping gateway 2020 may use the time between receiving data from the predictive transaction module 2015 and receipt of the transaction from the retailer point-of-sale 75 to bring stored data out of the large database and into a memory that provides for quicker access (in comparison to the access time from a large database) and comparison between the stored data and the data received from the merchant payment network. In this approach, the addition of this additional verification step in the validation mapping gateway 2020 will create less latency than may have otherwise been caused by the need to locate and retrieve the data for this comparison after receiving a transaction from the POS 75.

So returning to the consumer, after the portable device 50 has received the temporary credential and emulation information, the consumer may then tap or otherwise activate the smart phone 50 on the NFC peer-to-peer-enabled point of sale device 75, which causes the portable communication device to emulate the credential with the one-time payment code using the emulation protocol provided by the server. It being understood that the code may be visually "emulated" on the screen of the portable communication device 50. Because the temporary payment card data may be provided in legacy formats, the temporary payment card data may be accepted by existing merchant point-of-sale equipment 75.

The point of sale device 75 then processes the temporary payment card data through normal merchant payment network as if it were a standard credit or debit credential. However, because the temporary payment card data uses Issuer Identification Numbers (ISO/IEC7812) that were registered and mapped to the one-time payment system provider as the Issuer, the data will be routed to the validation mapping gateway 2020 via the merchant payment network. If the data is received by the validation mapping gateway 2020 prior to the expiration of the expiration time for the temporary credential and from the anticipated likely merchant, then the validation mapping gateway 2020 may approve the transaction (subject to the availability of funds, etc.). The validation mapping gateway 2020 may also compare the method by which the payment card data was entered into the merchant point-of-sale device 75 (existing ISO8583 specified field) with the method the temporary card data was provided to the mobile phone (e.g. Numeric code, barcode, NFC).

Again, if all the desired characteristics match (e.g. temporary code, execution time, merchant ID, and emulation type), the validation mapping gateway may return a confirmation to the merchant with approval code via the merchant payment network. The merchant point-of-sale 75 receives the authorization (i.e. confirmation of payment acceptance with approval code), prints a receipt, and the consumer leaves the store with their newly acquired items.

Alternatively, upon verification of the temporary payment card information (including timing and likely merchant ID), the system has the option to forward an equivalent payment transaction request to an issuer 310 to approve the transaction. This is known as executing a back-to-back payment transaction. In this way, the consumer and merchant would receive payment confirmation from the consumer's legacy bank credit card or debit card account, instead of the temporary card number. In particular, once the one-time payment transaction is confirmed, validation mapping gateway 2020 substitutes legacy card payment data in the transaction data, which is then passed onto the issuer authorization systems 310 along with standard POS transaction information (e.g. merchant ID, and transaction amount) and—in some embodiments—an indication that the transaction used a verified one-time use credential (to show an added measure of security). The issuer 310 will review the legacy card data and transaction information toward determining whether to authorize the transaction in a manner generally known in the art perhaps with the information that the transaction had the added security noted above. The issuer authorization is sent back to the merchant point-of-sale 75 via the normal existing processing channel.

This one-time use credential solution can be used for many different types of credential validation scenarios including: credit card and debit card payments, gift card, loyalty card, coupons and offers, access control, and any other environment where a consumer presents a credential for validation in a physical environment.

While the functionality may be integrated within one-time payment wallet 160, the user interface may be provided by wallet user interface and the over-the-air provisioning and management of and access to the secure payment subsystem is supported by the functionality of the card services module. Underlying the user interface, the card services module facilitates over-the-air provisioning, secure element management, and direct key exchange between the card services module on the user's mobile device 50 and the appropriate issuer server (for one-time payment wallet 160 that would be issuing engine 2010) in an encrypted fashion as was previously known in the art.

Validating One-Time Payment Application as a Third Party Application

Figure 8A:
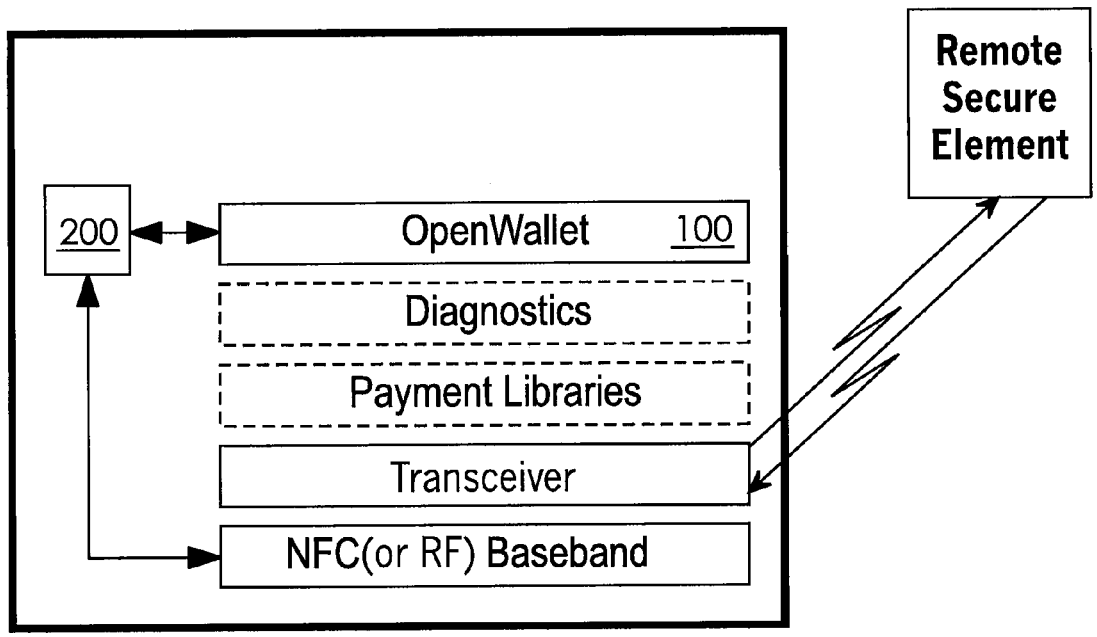
FIG. 8A is a block diagram illustrating some of the logical blocks within a portable communication device that may be relevant to the present system.
Figure 8B:
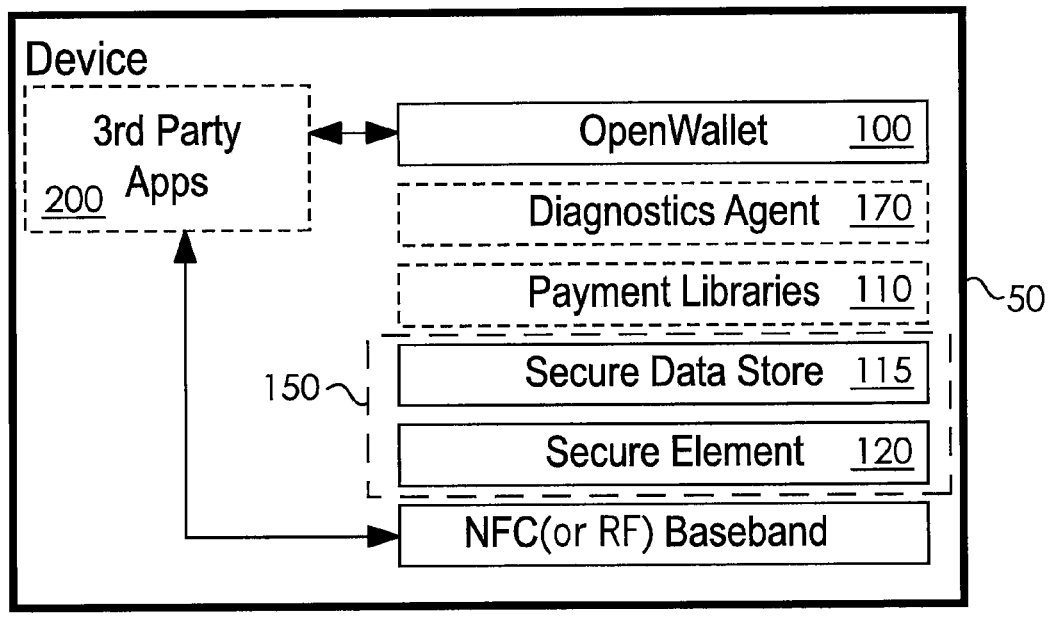
FIG. 8B is a block diagram illustrating further detail of the "one-time payment wallet" block of FIG. 8A that may be relevant to the present system.

As illustrated in FIG. 8A-8B, the one-time payment wallet 160 may be deployed as one of many trusted third party applications 200. The card services module verifies the trusted status of any application 200 before that application is allowed access to the secure element 120 (or secure data store 115 and even preferably the meta data repository which stores, among other things, card image data and any embossed card data) on the portable communication device 50 to view, select and/or change secure data stored in the payment subsystem 150. This verification may be accomplished by accessing a local authorization database of permitted or trusted applications. In a preferred approach, the local authorization database cooperates with a remote authorization database associated with one or more servers associated with system management back end 300.

Figure 10:
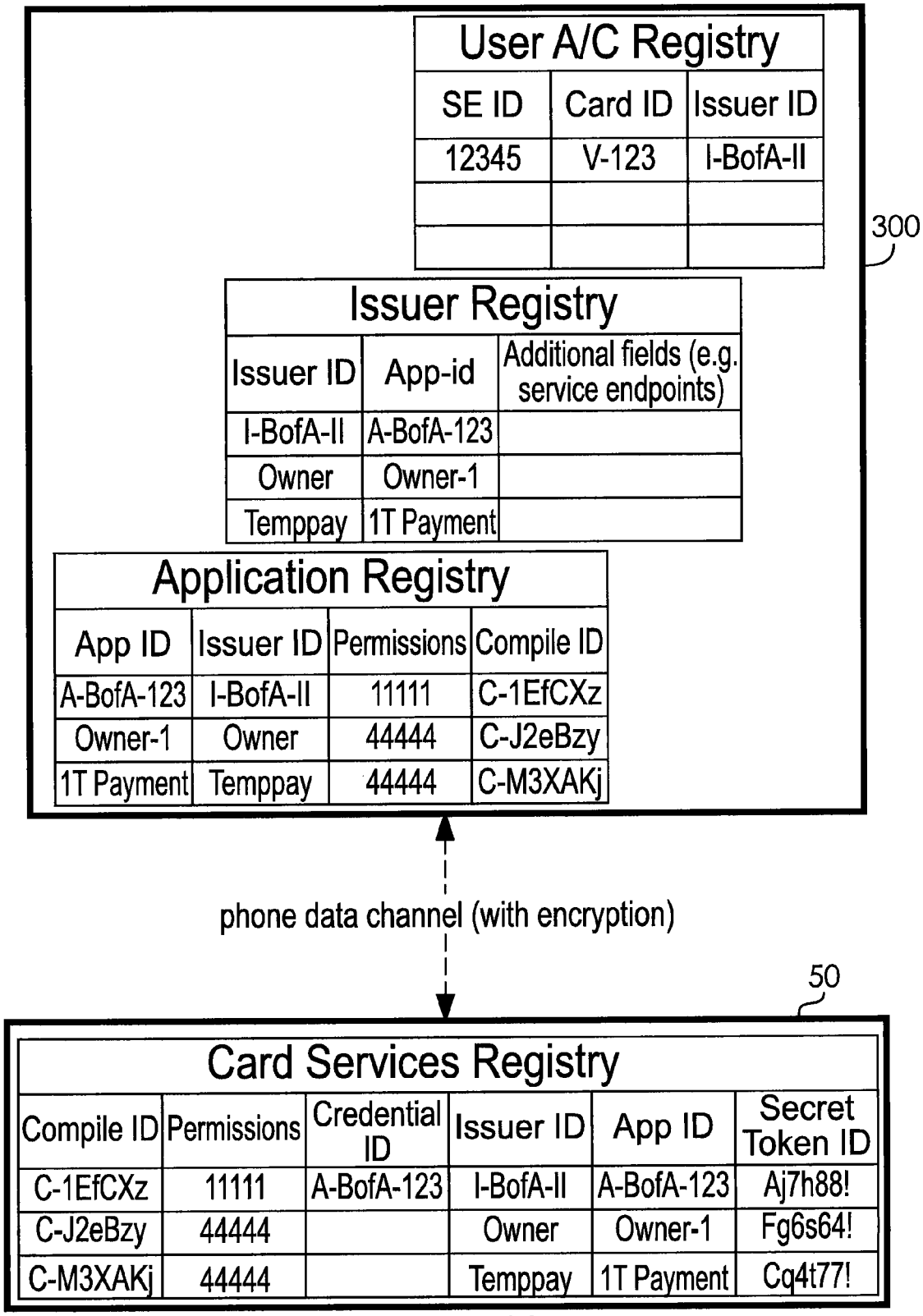
FIG. 10 is a block diagram of one potential implementation of a system underlying the grant of permission for the one-time payment app to view, select and/or change secure data stored in the payment subsystem.

FIG. 10 is a block diagram of one potential implementation of one potential combination local and remote authorization databases to enhance security of the card services module, secure element 120, and payment subsystem 150. As shown in FIG. 10, a User A/C Registry (or User Account Registry) may be associated with the server (or otherwise deployed in the cloud). The User A/C Registry may store the identification of the secure element 120 disposed in each user's portable device 50. Entries in the User Account Registry may be added for each user at any point in the process.

The "Issuer Registry" database is a database of approved Issuers. The Issuer ID is unique for each type of credential. In other words, if a bank has multiple types of credentials (e.g. debit cards, credit cards, affinity cards, etc.) each credential type would have its own Issuer ID (e.g. I-BofA-II). In a preferred approach, the Issuer ID as between multiple types of credentials would have some common elements, so as to indicate that the credentials are at least related (e.g. I-BofA-I). In this way applications from same the issuer can share data with the other application of the same "extended" issuer. In a preferred approach, card services module can be simplified by requiring even the wallet user interface (which "ships with the system") to have an Issuer ID (and as well as an Application ID and Compile token).

The "Application Registry" is a database of applications (mostly third party) that have been pre-approved by an operating system provider. Like the User A/C Registry, the "Application Registry" and "Issuer Registry" database are maintained on the server side (or otherwise in the cloud) in operable association with the one-time payment application. As would be understood by those of ordinary skill in the art having the present specification before them, the various registries may be implemented in separate databases or one unified database. At initiation of a wallet 160 and preferably at substantially regular time-intervals thereafter (e.g., daily), the data stored in the Application Registry of the one-time payment wallet 160 is distributed to devices with the wallet to be stored locally.

As shown in FIG. 10, the Application Registry may include, among other information, an Application ID ("App ID"), an Issuer ID, and a Compile ID or token. The Compile ID is a global constant generated for each application by one or more processes associated with one-time payment wallet during the qualification process for the particular application. After it is generated by a particular card services module on a unique device 50, the Compile token is included or otherwise associated with the application. This Compile token is preferably generated by a pseudo-random number generator local to the device that uses a predetermined seed, such as the Application ID, Compile ID, Issuer ID or some combination thereof.

When the user seeks to qualify an application with the card services module on a device 50, the Compile ID (a digital token) and Application ID (a digital identifier) associated with the third party application may be matched against the Compile ID and Application ID pairs stored in the Card Services Registry stored on the device 50 (see FIG. 10). As should be understood by those skilled in the art having the present specification before them, the same Compile and Application ID pairs are transmitted to other devices 50 associated with the system, as well. If the Compile ID/Application ID pair matches one of the pairs stored in the Card Services Registry on the device, a Secret Token ID is preferably generated on the device 50 by a pseudo-random number generator (such as the one associated with the Secure Element 120 and then stored in association with the Compile ID/Application ID pair in the Card Services Registry on the device 50. In some instances, the Compile ID may be pre-selected and used to seed the random number generator. It should be understood that one or more pieces of other predetermined data associated with the card services registry could be preselected as the seed instead. The Card Services Registry is preferably stored in secure memory (rather than the secure element 120 because secure element 120 has limited real estate) and the Card Services Registry is preferably further encrypted using standard encryption techniques. The Secret Token ID is also embedded in or otherwise associated with the application 200 on the device 50 in place of the Compile ID that was distributed with the application.

After the one-time payment wallet 160 has been loaded into the Card Services Registry (and the secret token embedded in the application), the one-time payment wallet 160 may launch and may prompt the user to opt-in to provide access to the issuer-specific credential needed for the validated (or trusted) application. In each subsequent launch of the one-time payment wallet application 160, the embedded Secret Token and/or Application ID are compared to the data in the Card Services Registry on the device. If there is match, the application is trusted and can access the payment subsystem 150 via card service module. In this manner, it can be seen that applications 200 or wallet user interface may also be removed from the Card Services Registry and thus would be disabled from accessing the payment subsystem and possibly the application, altogether.

Card services module also preferably uses the trusted application verification step to determine the appropriate level of subsystem access allowed for the one-time payment wallet 160. For example, in one embodiment, the application may be authorized to access and display all of the data contained in the payment subsystem 150, where another application may be only authorized to access and display a subset of the data contained in the payment subsystem 150. In yet another embodiment, an application may be permitted only to send a payment or transaction requests to one-time payment wallet 160, but may not itself be permitted to access any of the data contained in the payment subsystem 150. In one approach, assignment of permissions to the application can be thought of as follows:

|  | Reserved | All Credentials | Extended Issuer Credentials | Own Credentials |
| --- | --- | --- | --- | --- |
| Read | 0 | 0 or 1 | 0 or 1 | 0 or 1 |
| Write | 0 | 0 or 1 | 0 or 1 | 0 or 1 |
| Delete | 0 | 0 or 1 | 0 or 1 | 0 or 1 |
| Activate/ Deactivate | 0 | 0 or 1 | 0 or 1 | 0 or 1 |
| Download Credential | 0 | 0 or 1 | 0 or 1 | 0 or 1 |

These permissions can be used to form 4 hexadecimal number in the order shown above from most to least significant figure. As shown in the example Card Services Registry of FIG. 10, the I-BofA-II issuer has permission level 11111, which can be thought to expand to 0001 0001 0001 0001 0001. In other words, the I-BofA-II application can read, write, delete, activate/deactivate, and download its own credentials but not the extended issuer credentials let alone all credentials. If BofA had another issuer code (e.g. I-BofA-I), then that would be an extended Issuer application. So, if the permission level of the application associated with Issuer ID "I-BofA-II" was set to 0010 0001 0001 0010 0001 (or 21121 hexadecimal) then the application would be able to read and activate/deactivate the credentials associated with both issuer IDs. In yet another example, the wallet user interface may be given a permission level of 44444 (i.e. 0100 0100 0100 0100 0100). In other words, the wallet user interface can read, write, delete, activate/deactivate, and download all credentials. As would be understood by those of ordinary skill in the art, these are merely examples of potential permissions that can be granted to applications, other permissions are contemplated. For instance, some applications may have the ability to read extended issuer credentials, but only write, delete, activate and download the application's own credentials (e.g. 21111, which expands to 0010 0001 0001 0001 0001). In yet another example, an application may only be given activate/deactivate and download rights (e.g. 0000 0000 0000 0001 0001 or 00011 in hexadecimal). In yet another example, an application may be disabled—without being deleted from the trusted application database or Card Service Registry—by setting all rights to zero.

In the embodiment where the one-time payment wallet application 160 is configured as one of the trusted third party applications it would have to be registered in order to access OpenWallet 100 (or even card services module). The one-time payment wallet application 160 was developed by the issuer associated with issuing engine 2010. Further the one-time payment wallet application 160 may emulate NFC credentials. Accordingly, one-time payment wallet application 160 should be given a permission level 11111, which can be thought to expand to 0001 0001 0001 0001 0001. In other words, the one-time payment wallet application 160 can read, write, delete, activate/deactivate, and download its own credentials but not the extended issuer credentials or any other credentials.

The foregoing description and drawings refer to a one-time payment wallet 160, and one-time payment credentials or information or temporary payment card data that expires after a short predetermined period of time. It is recognized, however, that the one-time payment wallet 160 may instead be considered a dynamic temporary wallet 160 and that the one-time payment credentials/information and the temporary payment card data may be considered dynamic temporary credentials. As such, credentials may (1) be "recycled" and reused within the system by other users; (2) have a predetermined time to live that is longer than a "short" predetermined period of time and (3) that such credentials can be used for more than simply purchasing merchandise. It is further contemplated that although the foregoing description and drawings primarily refer to a point of sale device 75 associated with a merchant, the foregoing description, drawings and embodiments, can be applied to a variety of other electronic control points such as hotel room transceivers, office transceivers, rental car transceivers, etc. For example, electronic control points may include any access point such as point of sale devices, RFID transceivers, bar code transceivers, NFC transceivers, etc.

In particular, credentials must generally be "paid for" by an issuer 310 or other organization within the overall larger merchant payment system. As such, systems may only have a limited number of credentials at its disposal. Using such credentials only one-time for a particular user and transaction can lead to unnecessary high costs compared to a system wherein payment credentials are recycled for use by multiple users at disparate times and, preferably in disparate geo-locations to provide additional security against fraud. For example, issuing engine 2010 may track the issuance of and expiration data associated with credentials to a first user operating a first portable communication device 50 located in a first geolocation (e.g., California) and, subsequent to the expiration date and time of the credentials, reassign the very same credentials to a second user operating a second portable communication device 50 located in a second, disparate geolocation (e.g., Florida).

Figure 9A:
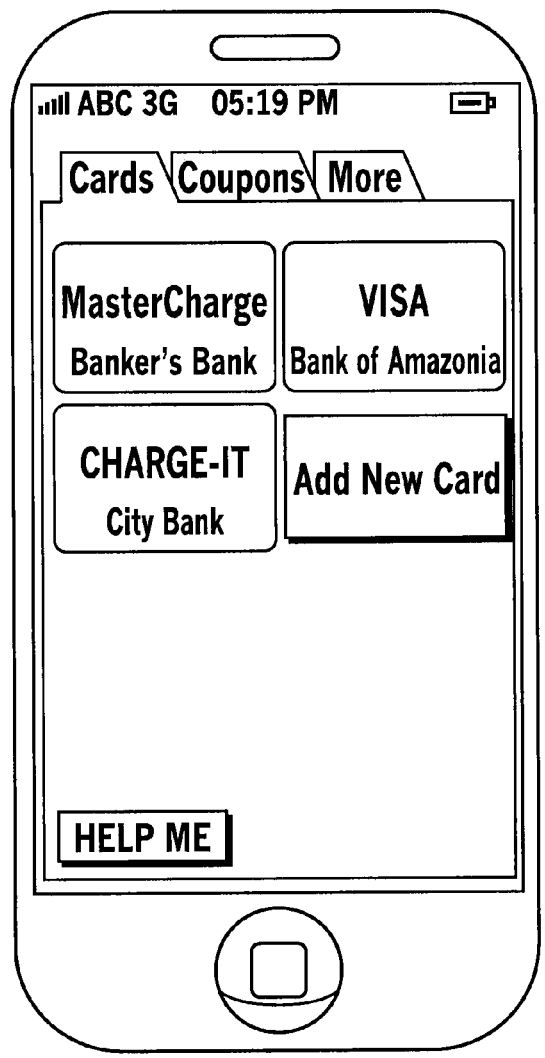
FIGS. 9A and 9B together illustrate one potential embodiment of a user interface that may be implemented on the illustrative smart phone further illustrating the flexibility of the one-time credential functionality coupled with a federated wallet.
Figure 9B:
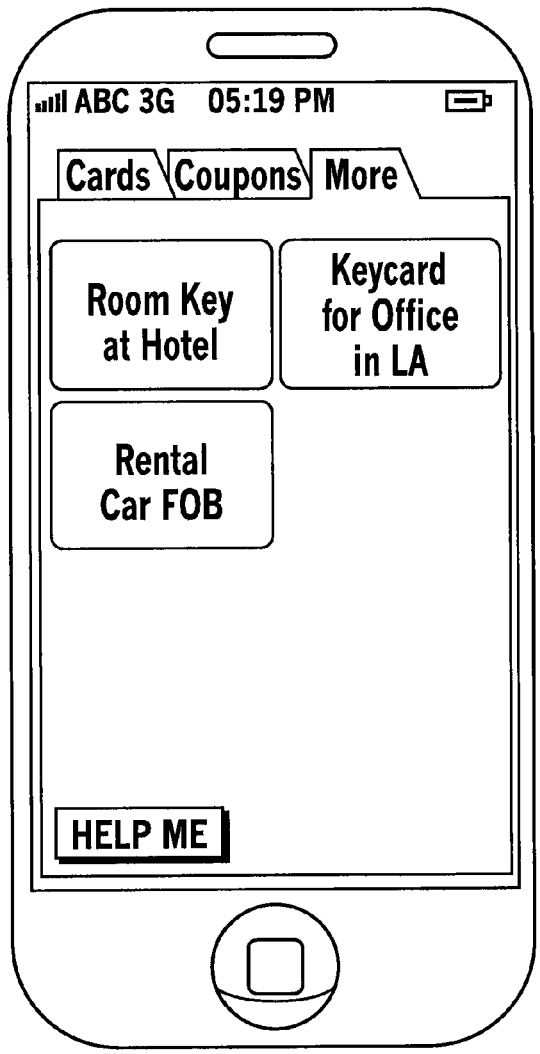

Similarly, credentials may have longer time to live periods to permit the use of the credentials at a variety of "points of sale" or other electronic control points. For example, with reference to FIGS. 9A and 9B, an exemplary wallet user interface is illustrated on a portable communication device 50. Wallet 160 may include and be associated with a variety of payment cards (e.g., MasterCharge, VISA, Charge-It, etc. as illustrated in FIG. 9A) and may further include and be associated with a variety of other non-payment applications (e.g., a room key at a hotel, an office keycard, a rental car FOB, etc. as illustrated in FIG. 9B). While the "time to live" period is preferably short in the context of a sale at a point of sale to provide enhanced security, it is contemplated that the "time to live" may be significantly longer when wallet is associated with non-payment applications such as a room key at a hotel. In such an example, the wallet 160 may be used to "open" or "lock" a user's room at a hotel. Thus, the "time to live" should be set to be at least coextensive with the user's stay at the hotel. Similarly, the time to live can be set to a period of time (infinite if necessary) to permit the user of device 50 to use the device 50 to access an office or a rental car.

It is therefore also contemplated that the system management back end 300 and issuer 310 may be associated with non-financial services to permit the usage of non-payment wallet applications. For example, system management back end 300 may include data relevant to non-financial services (e.g., hotel location, office location, etc.) and that issuer 310 may be affiliated with non-payment entities (e.g., hotel entities, office management entities, etc.).

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A system for verifying a transaction between a portable communication device and an electronic control point using a dynamic temporary credential issued to the portable communication device, the portable communication device having a service that provides a current geo-location of the portable communication device, the system comprising:
   means for storing passcode information in a user identification database:
   means for receiving a passcode and the current geo-location of the portable communication device from the portable communication device;
   means for verifying the passcode using the passcode information;
   means for determining, after verifying the passcode, using the current geo-location coordinates, one or more likely merchants and a type of electronic control point within the one or more likely merchants;
   means for generating a dynamic temporary credential using the determined type electronic control point and routing information of a validation mapping gateway;
   means for transmitting the generated dynamic temporary credential to the portable communication device; and
   means for providing the dynamic temporary credential, a merchant ID for the likely merchant, a user ID associated with the portable communication device, and an expiration time for the dynamic temporary credential to an authorization system operably associated with the electronic control point; and
   means for verifying the transaction with the dynamic temporary credential that was received from the electronic control point within the likely merchant before the expiration time and an emulation type associated with the electronic control point.

2. The system of claim 1 wherein the verifying means further verifies the pairing of the passcode with a unique digital signature associated with the portable communication device.

3. The system of claim 2 wherein the means for providing further provides the unique digital signature of the portable communication device.

4. The system of claim 1 wherein each of the one or more likely merchants is represented by a merchant name and a merchant identification code.

5. The system of claim 1 wherein the transmitting means further transmits the one or more likely merchants to the portable communication device, the system further comprising means for ascertaining confirmation of one of the one or more likely merchants from the portable communication device, the ascertaining means selecting another one or more likely merchant upon receiving an indication of no match.

6. The system of claim 1 wherein the authorization system further comprises a validation mapping gateway connected to a merchant payment network, the merchant payment network connected to the electronic control point which is a point-of-sale terminal.

7. The system of claim 6 wherein the validation mapping gateway includes a validation database containing the dynamic temporary credential and legacy payment data.

8. The system of claim 7 wherein the validation mapping gateway being operably connected to one or more issuers, the system further comprising means associated with the validation mapping gateway to substitute the legacy payment data for the dynamic temporary credential in a payment transaction before sending the payment transaction to the issuer associated with the legacy payment data.

9. The system of claim 8 wherein the means for verifying further includes means for verifying that an execution time matches an expected value.

10. The system of claim 9 wherein the means for verifying further includes means for verifying that the dynamic temporary credential is from the merchant most-likely located at the current geo-location.

11. The system of claim 1 wherein the expiration time is on the order of minutes, the system further comprising means for recycling the dynamic temporary credentials wherein the recycling means uses the current geo-location of the portable communication device, a geo-location of a second portable communication device and the expiration time associated with the dynamic temporary credential to transmit the dynamic temporary credential to the second portable communication device following expiration of the expiration time when the second portable communication device is located in a second disparate geo-location relative to the current geo-location of the first portable communication device.

12. A method for verifying a transaction between a portable communication device and an electronic control point using a dynamic temporary credential issued to the portable communication device, the portable communication device having a service that provides a current geo-location of the portable communication device, the method comprising:
   storing, by a centralized computer, passcode information in a user identification database:
   receiving, in the centralized computer, a passcode and the current geo-location of the portable communication device from the portable communication device;
   verifying, by the centralized computer, the passcode using the passcode information;
   based on the verifying, determining, by the centralized computer, using the current geo-location coordinates a likely merchant and a type of electronic control point within the likely merchant;
   generating, by the centralized computer, a dynamic temporary credential using the determined type electronic control point and routing information of a validation mapping gateway;
   transmitting, from the centralized computer, the generated dynamic temporary credential to the portable communication device; and providing, from the centralized computer, to an authorization system operably associated with the electronic control point, the dynamic temporary credential, a merchant ID for the likely merchant, user ID associated with the portable communication device, and expiration time for the dynamic temporary credential; and verifying, in the authorization system, the transaction with the dynamic temporary credential was received from the electronic control point of the determined type within the likely merchant before the expiration time.

13. The method of claim 12 further comprising:

transmitting, from the centralized computer to the portable communication device the merchant ID for the likely merchant; and receiving, by the centralized computer, a validation of the likely merchant from the portable communication device.

14. The method of claim 12 wherein the portable communication device has a unique digital signature, the verifying further comprises checking an association between the passcode and the unique digital signature.

15. The method of claim 12 wherein the method further comprises following authorization:

substituting legacy card payment data associated with an end user of the portable communication device for the dynamic temporary credential in a transaction record; and passing the transaction record onto an issuer authorization system for payment using the legacy card payment data associated with the end user.

* * * * *